(12) United States Patent
Cheong et al.

(10) Patent No.: US 7,042,816 B2
(45) Date of Patent: May 9, 2006

(54) OPTICAL PICKUP APPARATUS FOR OPTICAL DISK DRIVE AND HAVING A FLEXURED FLOATING SLIDER

(75) Inventors: Young-min Cheong, Seoul (KR); Byoung-young Bae, Pyoung (KR); Dong-seob Jang, Seoul (KR); Gyu-chan Jun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 559 days.

(21) Appl. No.: 09/984,431

(22) Filed: Oct. 30, 2001

(65) Prior Publication Data
US 2002/0075772 A1 Jun. 20, 2002

(30) Foreign Application Priority Data
Dec. 19, 2000 (KR) ................. 2000-78561

(51) Int. Cl.
*G11B 7/00* (2006.01)
(52) U.S. Cl. .................. 369/44.16; 369/44.32
(58) Field of Classification Search ............ 369/44.16, 369/44.32
See application file for complete search history.

(56) References Cited

U.S. PATENT DOCUMENTS

| | | | |
|---|---|---|---|
| 4,853,811 A * | 8/1989 | Brooks et al. ............ 360/234.7 |
| 5,144,607 A | 9/1992 | Ishida et al. | |
| 5,150,338 A | 9/1992 | Birecki et al. | |
| 5,184,263 A | 2/1993 | Fukakusa et al. | |
| 5,184,265 A * | 2/1993 | Foote et al. ............. 360/265.9 |
| 5,225,950 A * | 7/1993 | Crane ...................... 360/245.6 |
| 5,491,684 A * | 2/1996 | Terashima et al. .......... 720/666 |
| 5,615,203 A * | 3/1997 | Fukakusa .................... 720/682 |
| 5,729,889 A * | 3/1998 | Goss ....................... 29/603.06 |
| 5,943,188 A * | 8/1999 | Kazama ................... 360/234.7 |
| 6,016,292 A * | 1/2000 | Lee .......................... 369/44.15 |
| 6,069,773 A * | 5/2000 | Frater et al. ............. 360/245.7 |
| 6,181,522 B1 * | 1/2001 | Carlson ................... 360/245.1 |
| 6,226,238 B1 | 5/2001 | Kasono | |
| 6,288,875 B1 * | 9/2001 | Budde ..................... 360/245.3 |
| 6,473,389 B1 | 10/2002 | Hirai et al. | |

FOREIGN PATENT DOCUMENTS

| | | |
|---|---|---|
| JP | 62-102686 | 6/1987 |
| JP | 1-317233 | 12/1989 |
| JP | 3-156780 | 7/1991 |
| JP | 5-307851 | 11/1993 |
| JP | 7-129978 | 5/1995 |

(Continued)

*Primary Examiner*—Gautam R. Patel
(74) *Attorney, Agent, or Firm*—Stein, McEwen & Bui, LLP

(57) ABSTRACT

An optical pickup apparatus for an optical disk drive records or reproduces data on or from an optical disk, includes an optical head section including an object lens focusing an incident light on the optical disk, a slider on which the object lens is mounted, wherein the slider floats over the optical disk by an air bearing generated between the optical disk and the slider, a bobbin on which the slider is mounted, and a flexure disposed between the slider and the bobbins elastically supporting the slider. A driving unit drives the slider in a tracking direction and a focusing direction. In the above construction, the slider floats over a recording surface of the optical disk due to an air bearing and a near field between the object lens and the optical disk can be controllably maintained.

10 Claims, 7 Drawing Sheets

FOREIGN PATENT DOCUMENTS

| | | |
|---|---|---|
| JP | 11-288523 | 10/1999 |
| JP | 2000-36124 | 2/2000 |
| JP | 2000-149304 | 5/2000 |
| JP | 2000-163773 | 6/2000 |

* cited by examiner

OPTICAL PICKUP APPARATUS FOR OPTICAL DISK DRIVE AND HAVING A FLEXURED FLOATING SLIDER

CROSS-REFERENCE TO RELATED APPLICATION

This application is based upon and claims priority of Korean Patent Application No. 2000-78561 filed Dec. 19, 2000, the contents being incorporated herein by reference.

BACKGROUND OF THE INVENTION

1. Field of the Invention

The present invention relates to an optical pickup apparatus for an optical disk drive, more particularly, to an optical pickup apparatus for an optical disk drive for recording or reproducing data while floating by air bearing generated between the optical pickup apparatus and an optical disk.

2. Prior Art

Generally, an optical disk player is a device for recording or reproducing data on or from an optical disk, such as a CD, a CD-ROM, a DVD, or a DVD-ROM, and includes an optical pickup apparatus. The optical pickup apparatus records or reproduces the data by projecting a light on a recording surface of the optical disk.

An exemplary optical pickup apparatus is disclosed in U.S. Pat. No. 5,144,607. The optical pickup apparatus of the U.S. Pat. No. 5,144,607 includes an object lens for focusing a light on the optical disk, a bobbin for supporting the object lens, a wire spring for movably supporting the bobbin to/from a base, and a driving unit moving the bobbin. Moreover, the driving unit includes focusing coil wound around the bobbin for driving the bobbin in a focusing direction of the light, tracking coils for driving the bobbin in a tracking direction, which is perpendicular to the focusing direction, and magnets disposed corresponding to the focusing and tracking coils.

In the above construction, the position of an optical head including the object lens is determined according to the driving of the respective coils. That is, the position of the optical head is adjusted by moving the optical head toward or away from the optical disk using an electromagnetic force, which is generated when the electric current is supplied to the focusing coil. Also, the position of the optical head is adjusted in the tracking direction crossing the focusing direction when the electric current is supplied to the tracking coils. Here, a focusing error may be generated when the light projected from a light source is incident on the object lens through a light path and is focused on the surface of the optical disk. However, by adjusting the positions of the optical head minutely, the focusing error can be minimized.

However, conventional optical pickup apparatuses such as the apparatus of the U.S. Pat. No. 5,144,607, have high power consumption because these apparatuses require continuous electric current supply to the focusing coil for minute adjustment of the position of the optical head. Moreover, because the adjustable distance between the optical disk and the lens by the electromagnetic force is limited to about 1 mm, these conventional optical pickup apparatuses are difficult to apply to a high-density near field drive that requires a distance of less than tens of nm.

An optical recording or reproducing apparatus using an air bearing slider is disclosed in U.S. Pat. No. 5,150,338. The optical recording or reproducing apparatus of the U.S. Pat. No. 5,150,338 includes an object lens mounted on an air bearing slider, and the air bearing slider is connected to an actuator of a rotary type or a linear type. While driving the actuator, if an object lens of the optical recording or reproducing apparatus is positioned on a desired track of a recording surface of a magneto-optical memory disk, the air bearing slider floats over the optical disk and then maintains a minute focusing distance to/from the optical disk by an air bearing which is generated from the structure and weight of the slider and high speed rotation of the disk.

The actuator of the optical pickup apparatus of the U.S. Pat. No. 5,150,338 requires a servo control in the optical pickup to position the object lens on the desired track of the disk, and requires a high servo bandwidth due to a removable characteristic of the disk. However, when the air bearing slider is supported by a suspension, the available servo bandwidth is limited due to a limited frequency of the suspension.

SUMMARY OF THE INVENTION

Various objects and advantages of the invention will be set forth in part in the description that follows and, in part, will be obvious from the description, or may be learned by practice of the invention.

In order to solve the problems described above, an object of the present invention is to provide an optical pickup apparatus for an optical disk drive capable of realizing a high-density driver by adjusting an optical head minutely with low power, and widening a servo bandwidth of an pickup actuator by improving a structure thereof.

To accomplish the above and other objects, the optical pickup apparatus for the optical disk drive for recording or reproducing data on or from an optical disk, according to the present invention includes an optical head section including an object lens focusing an incident light on the optical disk; a slider on which the object lens is mounted, wherein the slider floats over the optical disk by an air bearing generated between the optical disk and the slider; a bobbin on which the slider is mounted; a flexure disposed between the slider and the bobbins elastically supporting the slider; and a driving unit driving the slider in a tracking direction and a focusing direction.

Here, the driving means includes focusing coils wound around the outside of the bobbin, tracking coils wound on the outside of the focusing coils, and driving magnets opposed to the tracking coils at a predetermined distance from the tracking coils.

Meanwhile, the focusing coils are wound around a periphery of the bobbin, and the tracking coils are wound and disposed on the outside of the focusing coils in pairs. The tracking coils are opposed to each other while the bobbin is positioned therebetween.

According to another aspect of the present invention, the optical pickup apparatus for the optical disk drive further includes a plurality of supporting bars extended from the bobbin, wire suspensions seated on ends of the supporting bars for elastically supporting the bobbin, and a pair of blocks for supporting ends of the wire suspensions.

Preferably, the flexure includes a supporting portion in contact with the bobbin, and a seating portion connected to the supporting portion for providing the slider seated thereon with a degree of freedom for rotating movement at least in one direction.]

Accordingly, because the near field between the optical head and the optical disk can be maintained by floating the slider over a recording surface of the optical disk by the air bearing, it is possible to realize a high-density drive. Also, because there is no limitation to the servo bandwidth due to the wire suspensions, a position error of the optical head can be reduced.

The present invention further provides a method of driving an optical pickup including an optical head section and a driving unit, the method including: positioning the optical head section on a desired track of an optical disk to record or reproduce data on or from the optical disk; supplying electric current to a focusing coil in the driving unit to provide the optical head section with a loading force; deforming wire suspensions supporting the optical head section using the loading force; generating an air bearing between the optical pickup apparatus and an optical disk; stopping the electric current supply to the focusing coil to eliminate the loading force to the optical head section; maintaining the optical head section loaded due to an elastic force of the wire suspensions; and recording or reproducing data on or from the optical disk.

Furthermore, it is another object of the present invention to provide for a method of driving an optical pickup including an optical head section and a driving unit, the method including: completing recording or reproducing data on or from an optical disk; supplying electric current to a focusing coil in the driving unit in an opposite direction to a predetermined direction in which the optical head section is loaded; providing the optical head section with an unloading force in an unloading direction to overcome an elastic force from the wire suspensions; removing an air bearing generated between the optical head section and the optical disk; and unloading the optical head section.

Furthermore, it is another object of the present invention to provide for a method of driving an optical pickup including an optical head section and a driving unit, the method, including: positioning the optical head section on a desired track of an optical disk to record or reproduce data on or from the optical disk; detecting an external shock; supplying electric current to a focusing coil in the driving unit in an opposite direction to a predetermined direction in which the optical head section is loaded in response to the external shock; and providing the optical head section with an unloading force in an unloading direction to overcome an elastic force from the wire suspensions.

Furthermore, it is another object of the present invention to provide for a method of driving an optical pickup including an optical head section and a driving unit, the method including: positioning the optical head section on a desired track of an optical disk to record or reproduce data on or from the optical disk; supplying electric current to a focusing coil in the driving unit in a predetermined direction to provide the optical head section with a loading force; deforming wire suspensions supporting the optical head section using the loading force; stopping the electric current supply to the focusing coil to eliminate the loading force to the optical head section; maintaining the optical head section loaded due to an elastic force of the wire suspensions; recording or reproducing data on the optical disk; detecting an external shock; supplying electric current to the focusing coil in the driving unit in an opposite direction to the predetermined direction in which the optical head section is loaded in response to the external shock; providing the optical head section with an unloading force in an unloading direction to overcome an elastic force from the wire suspensions; and unloading the optical disk.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The objects and characteristic of the present invention will be more apparent by describing the preferred embodiment of the present invention with reference to the accompanied reference drawings, in which.

DETAILED DESCRIPTION OF THE PREFERRED EMBODIMENT

The preferred embodiment of the present invention is described below with reference to the accompanied reference drawings.

Figure 1:
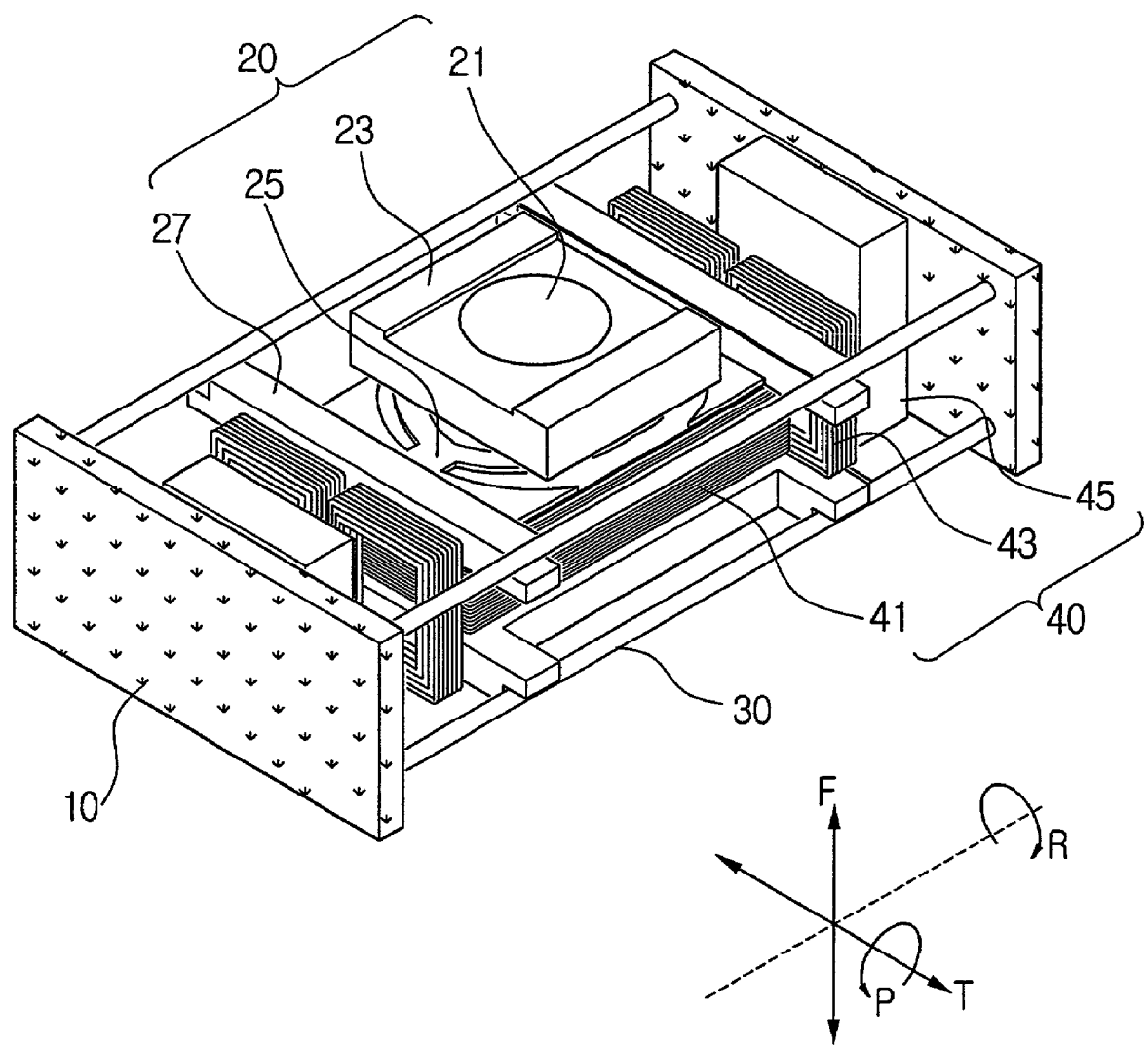
FIG. 1 is a schematic diagram showing an optical pickup apparatus for an optical disk drive according to an exemplary embodiment the present invention.
Figure 2:
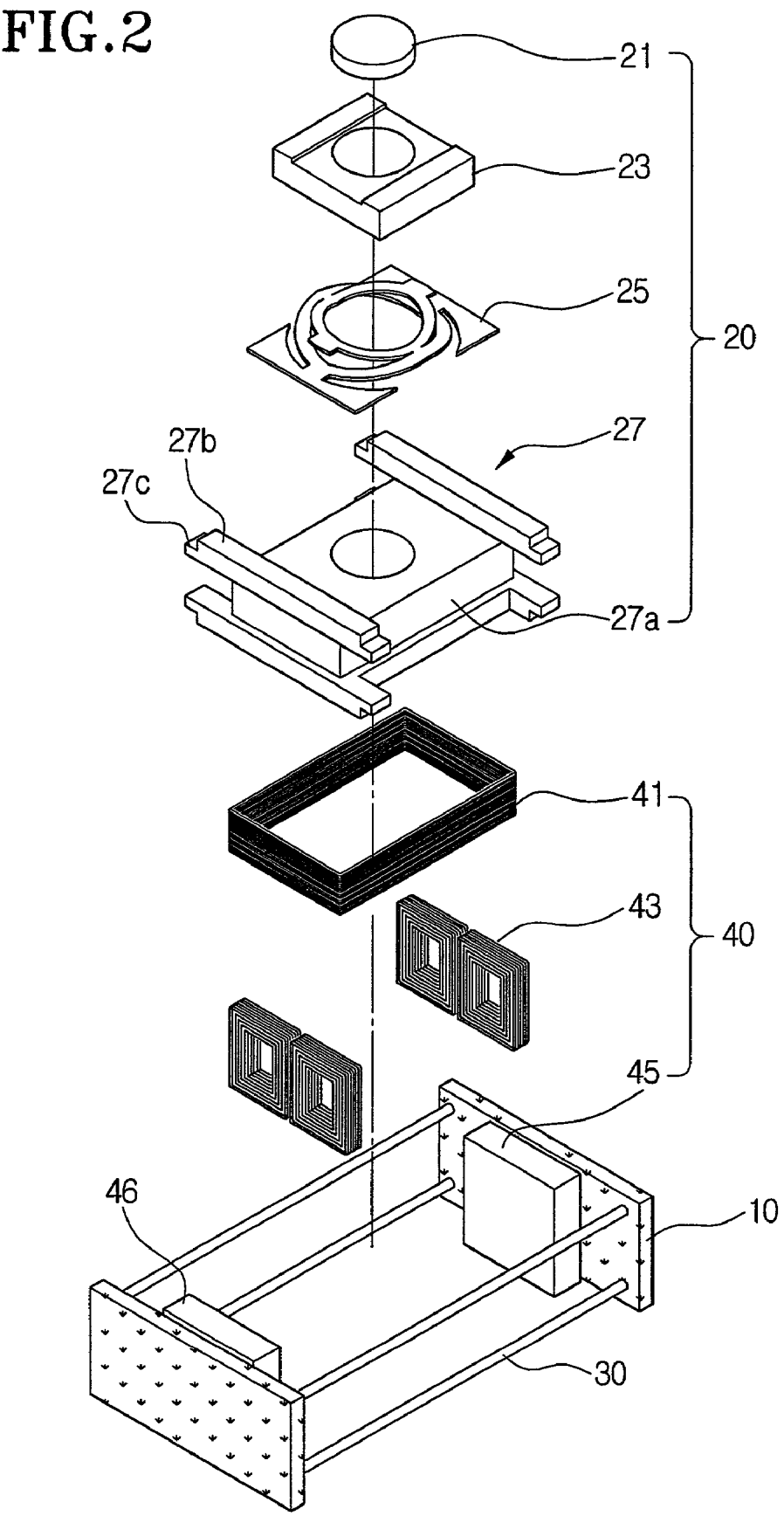
FIG. 2 is an exploded perspective view showing the optical pickup apparatus of FIG. 1.

As shown in FIGS. 1 and 2, an optical pickup apparatus for an optical disk drive according to the present invention comprises a pair of blocks 10, an optical head section 20 including an object lens 21, wire suspensions 30, and a driving unit 40. The pair of blocks 10 are disposed on opposite ends of the wire suspensions 30 supporting the wire suspensions 30. The optical head section 20 includes a slider 23 on which the object lens 21 is mounted, a flexure 25 on which the slider 23 is mounted, and a coil bobbin 27 supporting the flexure 25. The object lens 21 focuses an incident light on a recording surface of an optical disk.

Figure 3:
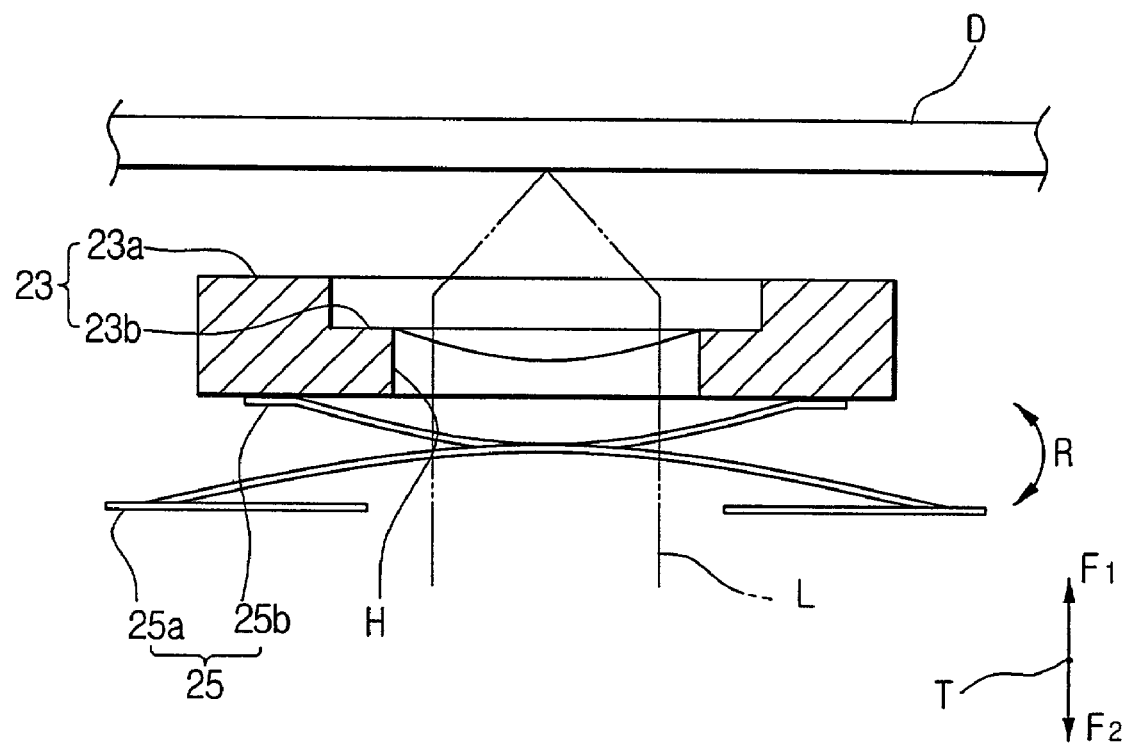
FIG. 3 is a section view showing a main portion of an optical head section of the optical pickup apparatus of FIG. 1.

As shown in FIG. 3, the slider 23 includes an air bearing surface 23a facing the optical disk D a receiver 23b dented from the air bearing surface 23a for receiving the object lens 21, a light passage hole H formed in the center of the receiver 23b for permitting a light L to pass therethrough. The slider 23 floats over the optical disk D as a result of an air bearing generated between the slider 23 and the optical disk D. A near field is formed between the optical disk D and the slider 23.

The flexure 25 provides the slider 23 with a degree of freedom for rotating within a predetermined range while the slider 23 floats over the optical disk D due to the air bearing. As shown in FIG. 3, the flexure 25 has a supporting portion 25a supported by the coil bobbin 27 (shown in FIG. 2), and a seating portion 25b protruding from the supporting portion 25a and elastically deformable in a rolling direction R and a pitching direction P by an external force. Accordingly, when the slider 23 floats over the optical disk D due to the air bearing, deformation of the flexure 25 allows the slider 23 to perform rolling and pitching movements.

As shown in FIG. 2, the coil bobbin 27 comprises a winding portion 27a, and four (4) supporting bars 27b extended from opposite sides of top and bottom of the winding portion 27a. The winding portion 27a is in the shape of a box which has a hole formed in the center for permitting the light to pass therethrough. The supporting bars 27a have recesses 27c in which the wire suspensions 30 are seated.

The wire suspensions 30 are made of metallic material of a predetermined rigidity so as to have an elastic restoring force in the focusing and the tracking directions F and T. In the present embodiment, four (4) wire suspensions 30 are used for stably supporting the optical head section 20. Thus, the optical head section 20 is movably supported by the four (4) wire suspensions 30 in the focusing and the tracking directions F and T in an elastic manner. Specifically, the wire suspensions 30, having ends attached to the blocks, are elastically deformed by an external force in the focusing and the tracking directions F and T thereby moving the optical head section 20. Further, the wire suspensions 30 provide the optical head section 20 with a gram-force (described below) in the focusing direction F, allowing the slider 23 to float by the air bearing in a near field formed between the slider 23 and the optical disk D. The wire suspensions 30 also serve as a conductor capable of supplying electric current to a focusing coil 41 and tracking coils 43 (described below).

The driving unit 40 provides an external force for moving the optical head section 20 in the focusing and the tracking directions, F and T. The driving unit 40 includes focusing coil 41 to provide the optical head section 20 with an electromagnetic force in the focusing direction, F, tracking coils 43 to provide electromagnetic force in the tracking direction, T, and a pair of driving magnets 45 and 46 disposed to correspond to the focusing coil 41 and tracking coils 43.

The focusing coil 41 are wound around the winding portion 27a of the coil bobbin 27. The tracking coils 43 are wound and disposed on the outside of the focusing coil 41. The tracking coils 43 are opposite from each other while the coil bobbin 27 is positioned therebetween. The magnets 45 and 46 are opposite to each other. The magnets 45 and 46 each form a predetermined magnetic gap between the tracking coils 43 and are supported on the blocks 10 by the wire suspensions 30. If electric current is supplied to the focusing and tracking coils 41 and 43, the magnets 45 and 46 generate electromagnetic force by interacting with the focusing coil 41 and the tracking coils 43, thereby force-moving the optical head section 20 minutely in the focusing and the tracking directions, F and T. Thus, the near field can be controllably maintained by controlling the amount of electric current supplied to the focusing coil 41 and the tracking coils 43. The electromagnetic force generated by the magnets 45 and 46 due to the interaction with the coils 41 and 43 will vary depending on the amount of electric current provided. In an embodiment, the four (4) tracking coils 43 are aligned in pairs to correspond to the magnets 45 and 46 for an easier movement of the optical head section 20 in the tracking direction, T. Accordingly, because the near field between the optical head and the optical disk can be maintained by floating the slider 23 over a recording surface of the optical disk D by the air bearing, it is possible to realize a high-density drive. Also, because there is no limitation to the servo bandwidth due to the wire suspensions, a position error of the optical head can be reduced.

A driving operation of the optical pickup apparatus for the optical disk drive according to an exemplary embodiment of the present invention having a construction as described above is described referring to FIGS. 4 through 5 as follows.

When the optical head section 20 is positioned on the desired track of the optical disk D for recoding or reproducing data, the electric current is supplied to the focusing coil 41 in a direction that provides the optical head section 20 with a so-called loading force in a loading direction F1. Specifically, when the electric current is supplied to the focusing coil 41 in a predetermined direction, the optical head section 20 is exposed to the loading force in the loading direction F1 due to an interaction between the focusing coil 41 and the magnets 45 and 46. The optical head section 20 is loaded toward the optical disk D while the wire suspensions 30 are deformed by the loading force.

Figure 4:
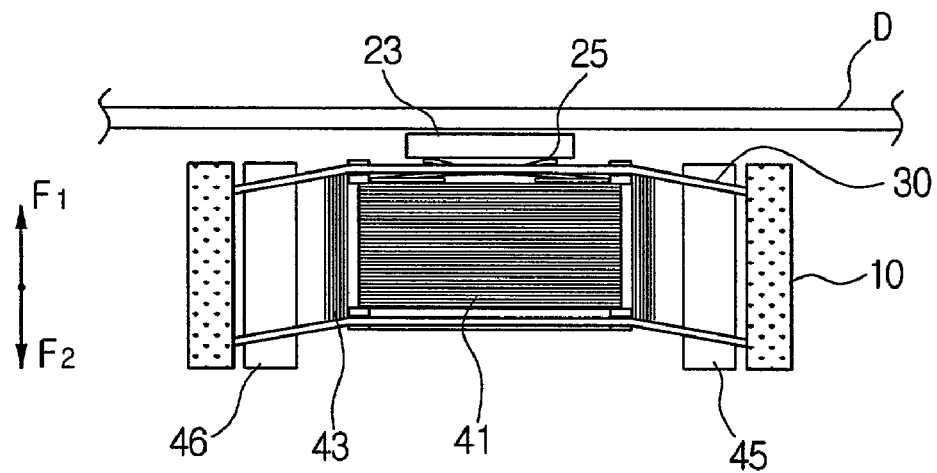
FIG. 4 is a front view showing a loaded position of the optical pickup apparatus of FIG. 1.

When the optical head section 20 travels in the loading direction F1 and the optical disk D is rotated at high speed by a spindle motor (not shown), the air bearing is generated between the optical disk D and the slider 23. As shown in FIG. 4, the slider 23 floats and maintains a distance of tens of nm from the optical disk D in the near field formed therebetween. The distance between the optical disk D and the slider 23 is determined by a floating height depending on the air bearing surface 23a of the slider 23. When the optical head section 20 is loaded, even though the coil bobbin 27 and the optical disk D deviate from their parallel relation, the slider 23 can remain in a parallel relation with respect to the optical disk D by the flexure 25 which is elastically deformed in the rolling and pitching directions, R and P, as shown in FIG. 1.

After the air bearing is generated between the optical head section 20 and the optical disk D, the electric current supply to the focusing coil 41 is stopped to eliminate the loading force to the optical head section 20. The optical head section 20 is then exposed to both the attraction force in the loading direction F1 by the air bearing, and the gram-force in the unloading direction F2 due to the elastic force from the wire suspensions 30. Thus, a balance between the attraction force and the gram-force allows the near field to be continuously maintained. As described above, if the supply of the electric current is stopped after a predetermined time, the optical head section 20 can be maintained in a loaded position. Accordingly, it is not necessary to supply the electric current to the focusing coil 41 continuously, thereby reducing power consumption.

Subsequently, if the electric current is supplied to the tracking coils 43, the optical head section 20 moves minutely in the tracking direction T of the optical disk D while maintaining the near field, and records or reproduces data by focusing the light on the optical disk D.

Figure 5:
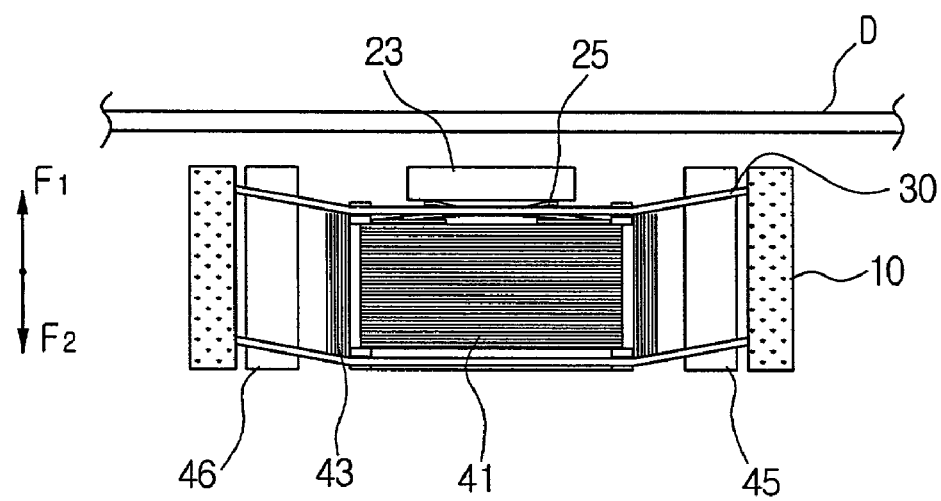
FIG. 5 is a front view showing an unloaded position of the optical pickup apparatus of FIG. 1.

If the optical head section 20 completes recording or reproducing data on or from the optical disk D the rotation of the optical disk D is stopped and the optical head section 20 moves in the unloading direction F2 by the gram-force. Simultaneously, if the electric current is supplied to the focusing coil 41 in an opposite direction to the predetermined direction in which the optical head section 20 is loaded, the optical head section 20 is exposed to an unloading force in the unloading direction F2 by the interaction between the focusing coil 41 and the magnets 45 and 46. The air bearing generated between the slider 23 in the optical head section 20 and an optical disk D is removed. Accordingly, as shown in FIG. 5, the optical head section 20 moves away from the optical disk D and the optical head section 20 is then unloaded.

As shown in FIG. 4, when the optical disk D in the optical head section 20 is loaded and there is external vibration and shock to the disk driver, a shock-detecting sensor (not shown) detects the vibration and shock. Then, by supplying the electric current to the focusing coil 41, the optical head section 20 is exposed to the unloading force to overcome the gram-force. Thus, the optical head section 20 is moved and positioned away from the optical disk D as shown in FIG. 5 by the unloading force. Accordingly, when external disturbance or shock occurs, the optical head section 20 is moved and positioned in the secure position, i.e., free from the external disturbance or shock, thereby preventing damage from collision between the optical head section 20 and the optical disk D.

Figure 6:
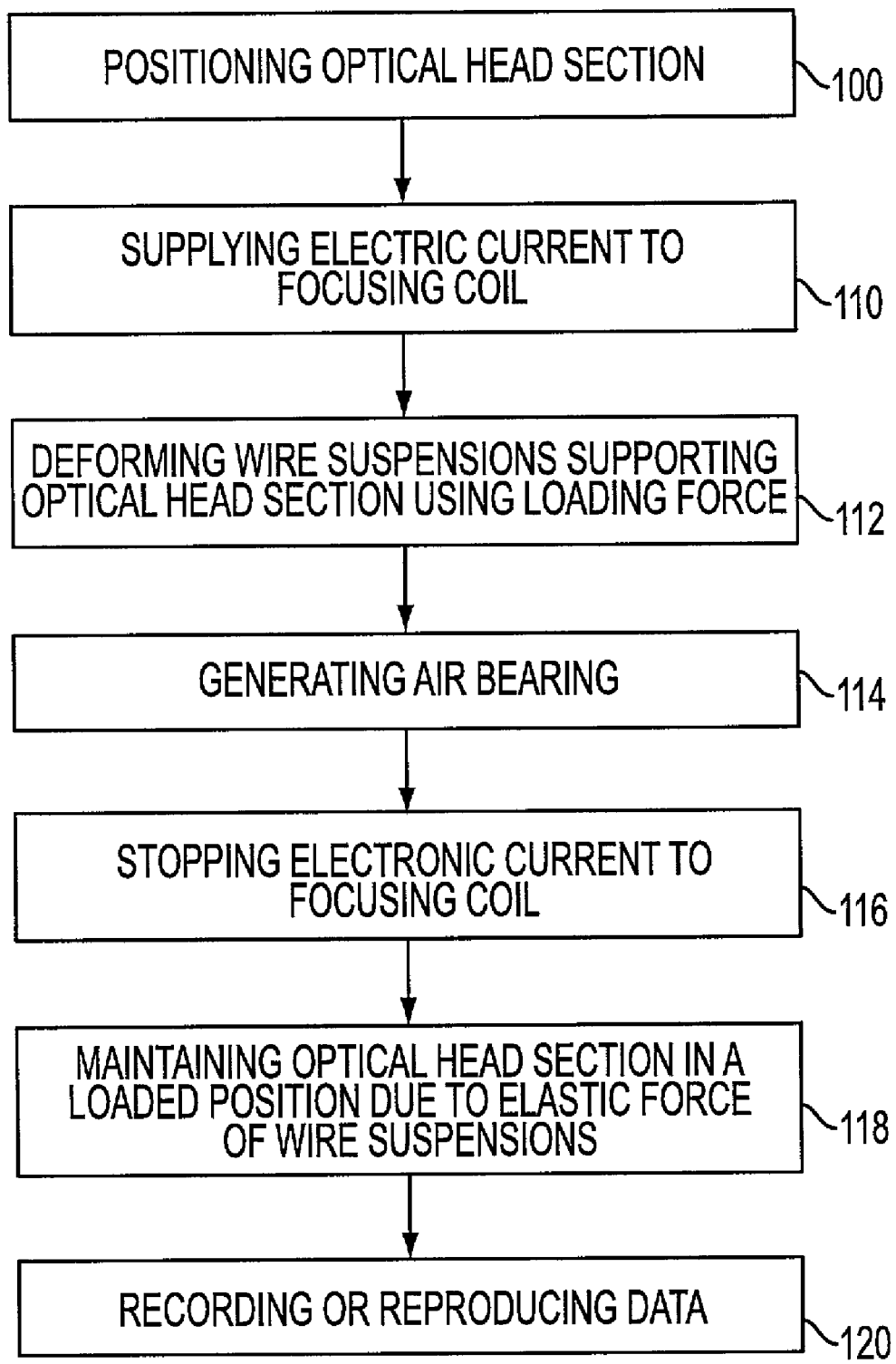
FIG. 6 is a flow chart showing a method of loading the optical pickup apparatus of FIG. 1.

FIG. 6 is a flow chart showing a method of loading the optical pickup apparatus of FIG. 1. At operation 100, the optical head section 20 is positioned on a desired track of an optical disk D to record or reproduce data on or from the optical disk D. At operation 110, electric current is supplied to the focusing coil 41 in the driving unit 40 to provide the optical head section 20 with a loading force. At operation 110, the wire suspensions 30 are deformed, supporting the optical head section 20 using the loading force. At operation 114, an air bearing is generated between the optical pickup apparatus and an optical disk D. At operation 116, the electric current supply to the focusing coil 41 is stopped to eliminate the loading force to the optical head section 20. At operation 118, the optical head section 20 is maintained in the loaded position due to an elastic force of the wire suspensions 30. At operation 120, data is recorded or reproduced on or from the optical disk D.

Figure 7:
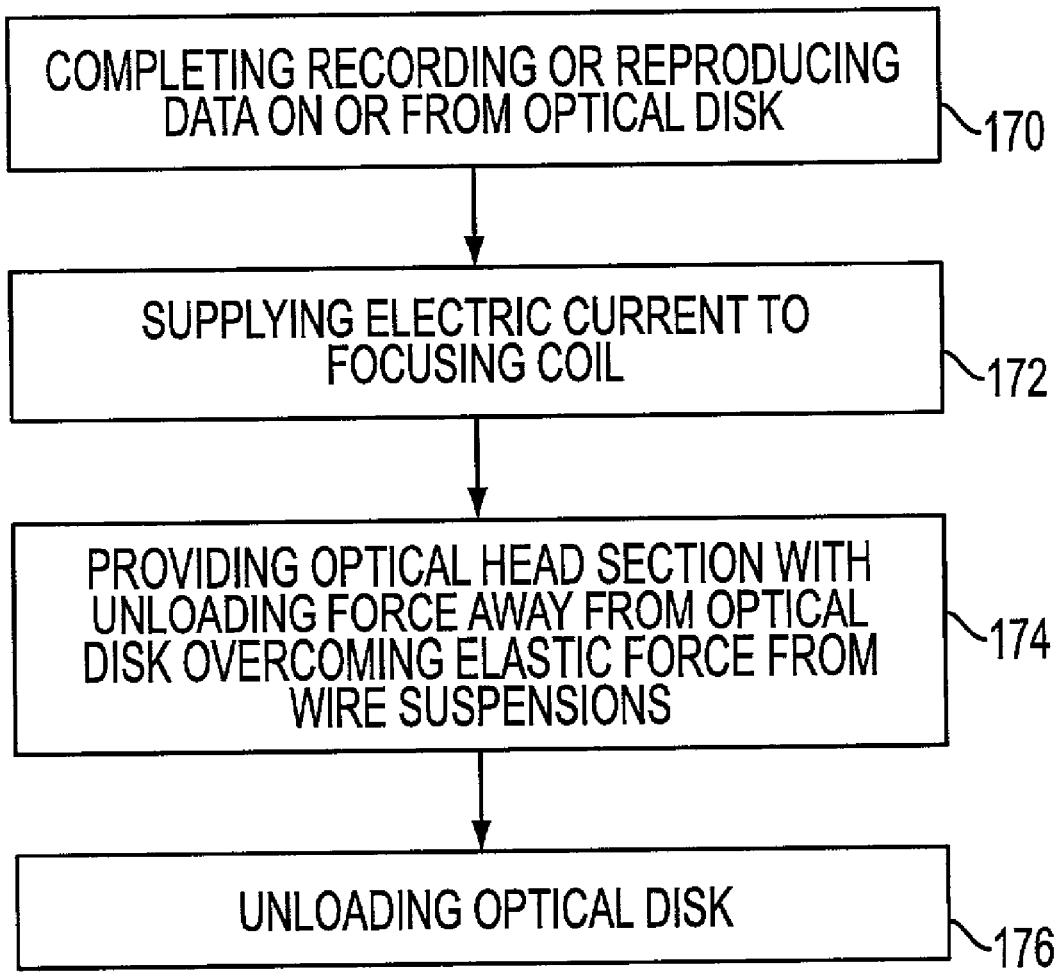
FIG. 7 is a flow chart showing a method of unloading the optical pickup apparatus of FIG. 1.

FIG. 7 is a flow chart showing a method of unloading the optical pickup apparatus of FIG. 1. At operation 170, the recording or reproducing data on or from an optical disk D is completed. At operation 172, electric current is supplied to the focusing coil 41 in the driving unit 40 in an opposite direction to a predetermined direction in which the optical head section 20 is loaded. At operation 174, the optical head section 20 is provided with an unloading force in an unloading direction to overcome an elastic force from the wire suspensions 30. At operation 176, the optical head section 20 is unloaded.

Figure 8:
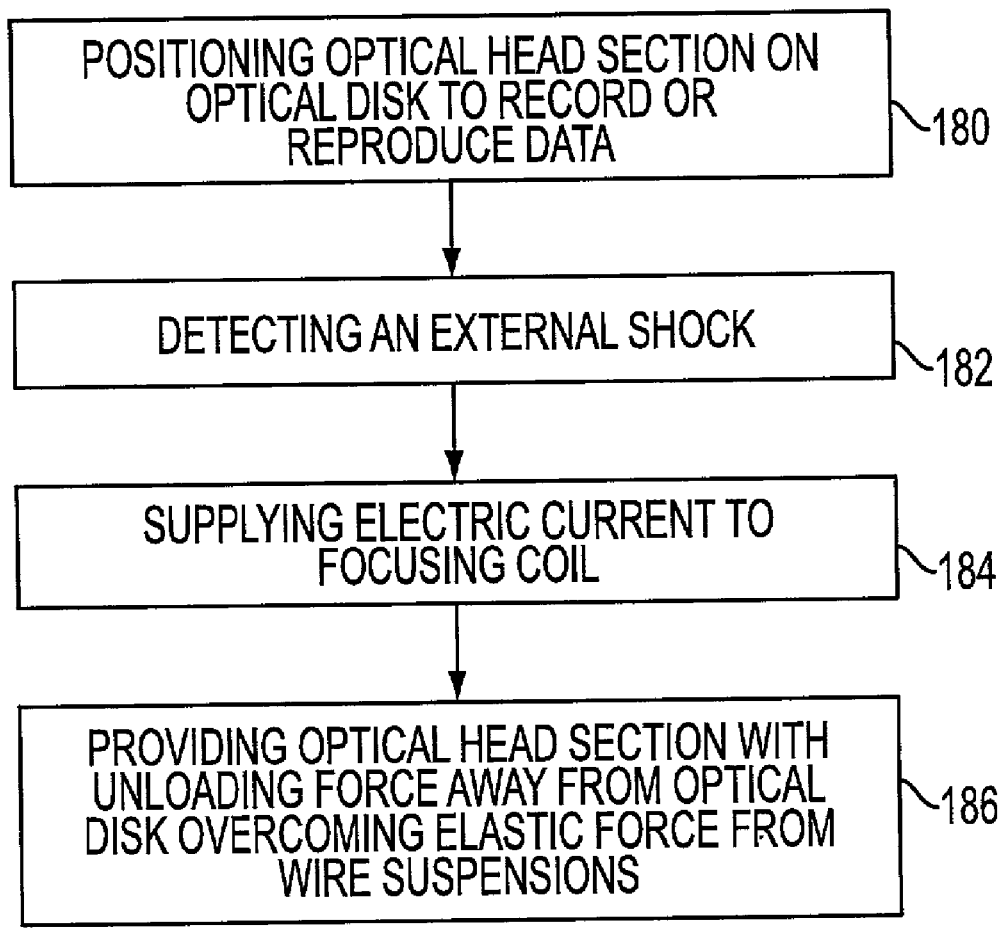
FIG. 8 is a flow chart showing a method of detecting an external shock to the optical pickup apparatus of FIG. 1.

FIG. 8 is a flow chart showing a method of detecting an external shock to the optical pickup apparatus of FIG. 1. At operation 180, the optical head section 20 is positioned on a desired track of an optical disk D to record or reproduce data on or from the optical disk D. At operation 182, the shock-detecting sensor detects an external shock affecting the optical disk D. At operation 184, electric current is supplied to the focusing coil 41 in the driving unit 40 in an opposite direction to a predetermined direction in which the optical head section 20 is loaded in response to the external shock. At operation 186, the optical head section 20 is provided with an unloading force in an unloading direction to overcome an elastic force from the wire suspensions 30.

An optical fiber having a sharp tip may be integrally formed with the slider 23 for focusing the light. Also, a optical magnetic saving coil may be formed in the optical head section 20. Although, the object lens 21 is used for recording or reproducing data on or from the optical disk D in the present embodiment, the present invention can be also applied to an apparatus in which a magnetic head is mounted on the slider 23 for recording or reproducing the data on or from a magnetic disk.

As described above, in the optical pickup apparatus for the optical disk driver, the slider 23 floats over the recoding surface of the optical disk D to a minute height by the air bearing. Also, the near field between the optical head section 20 and the optical disk D can be controllably maintained by controlling the amount of electric current supplied to the focusing coil 41 and the tracking coils 43. Accordingly, the high-density driver can be achieved.

Because there is no limitation to the servo bandwidth of the pickup actuator, which is generated when using the conventional suspension, the position error of the optical head section 20 can be reduced accordingly. Further, because the optical head section 20 is loaded or unloaded by supplying the electric current to the focusing coil 41 without requiring an extra structure, it is economical and capable of avoiding any damage from the external vibration and shock.

Although the preferred embodiment of the present invention has been shown and described, it will be appreciated by those skilled in the art that changes may be made in theses embodiments without departing from the principles and spirit of the invention, scope of which is defined in the claims and their equivalents.

What is claimed is:

1. An optical pickup for an optical disk drive for recording or reproducing data on or from an optical disk, comprising:
    an optical head section comprising
        an object lens focusing an incident light on the optical disk,
        a slider on which the object lens is mounted, wherein the slider floats over the optical disk by an air bearing generated between the optical disk and the slider,
        a bobbin on which the slider is mounted, and
        a flexure disposed between the slider and the bobbin, the flexure further comprising:
            a supporting portion, supported by the bobbin, and
            a seating portion connected to the supporting portion, the seating portion elastically deformable and providing the slider with freedom to rotate in a rolling direction and a pitching direction, the seating portion having a central opening passing the incident light; and
    a driving unit driving the slider in a tracking direction and a focusing direction.

2. The optical pickup as recited in claim 1, wherein the driving unit comprises:
    a focusing coil providing the slider with an electromagnetic force in the focusing direction;
    tracking coils providing an electromagnetic force to the slider in the tracking direction; and
    driving magnets opposite to the tracking coils at a predetermined distance from the tracking coils.

3. The optical pickup as recited in claim 2, wherein:
    the focusing coil is wound around a periphery of the bobbin, and
    the tracking coils are wound and disposed on an outside of the focusing coil in pairs opposite to each other and the bobbin is positioned therebetween.

4. The optical pickup as recited in claim 3, wherein a near field is formed between the optical disk and the slider, where the near field is controllably maintained by controlling an amount of electric current supplied to the focusing coil and the tracking coils and the driving magnets generate an electromagnetic force by interacting with the focusing coil and the tracking coils to move the optical head section in the focusing and tracking directions.

5. The optical pickup as recited in claim 2, further comprising:
    supporting bars extended from the bobbin;
    wire suspensions connected to of the supporting bars, elastically supporting the optical head section; and
    a pair of blocks disposed on opposite ends of the wire suspensions, supporting ends of the wire suspensions.

6. The optical pickup as recited in claim 5, wherein the wire suspensions are elastically deformed by an external force in the focusing and the tracking directions to elastically support the optical head section in the focusing and tracking directions.

7. The optical pickup as recited in claim 1, wherein the seating portion is elastically deformable in the rolling direction and the pitching direction by an external force.

8. The optical pickup apparatus as recited in claim 1, wherein the slider comprises:
   a receiver dented from an air bearing surface receiving the object lens; and
   a light passage hole formed in a center of the receiver, permitting the incident light to pass therethrough.

9. The optical pickup apparatus as recited in claim 1, wherein the flexure allows the slider to rotate in the rolling and pitching directions within a predetermined range while the slider floats over the optical disk by the air bearing generated between the optical disk and the slider.

10. The optical pickup as recited in claim 1, wherein the supporting portion of the flexure and the seating portion of the flexure are spaced apart from each other in the focusing direction.

* * * * *

UNITED STATES PATENT AND TRADEMARK OFFICE
CERTIFICATE OF CORRECTION

| | |
|---|---|
| PATENT NO. | : 7,042,816 B2 |
| APPLICATION NO. | : 09/984431 |
| DATED | : May 9, 2006 |
| INVENTOR(S) | : Young-min Cheong et al. |

It is certified that error appears in the above-identified patent and that said Letters Patent is hereby corrected as shown below:

Column 10, line 5 insert -- the --before "pitching"

Signed and Sealed this

Fifth Day of December, 2006

JON W. DUDAS
*Director of the United States Patent and Trademark Office*